United States Patent [19]

Ichikawa et al.

[11] Patent Number: 5,501,897
[45] Date of Patent: Mar. 26, 1996

[54] TRACKING RESISTANT PRESSURE-SENSITIVE ADHESIVE TAPE

[75] Inventors: Hiroki Ichikawa; Kaoru Aizawa; Toshimitsu Okuno, all of Osaka, Japan

[73] Assignee: Nitto Denko Corporation, Osaka, Japan

[21] Appl. No.: 332,440

[22] Filed: Oct. 31, 1994

Related U.S. Application Data

[63] Continuation of Ser. No. 27,847, Mar. 8, 1993, abandoned.

[51] Int. Cl.$^6$ .................................................. C09J 7/02
[52] U.S. Cl. .............................. 428/261; 428/343; 428/354
[58] Field of Search ..................................... 428/343, 354, 428/261

[56] References Cited

U.S. PATENT DOCUMENTS

| | | | |
|---|---|---|---|
| 3,922,186 | 11/1975 | Segawa | 428/343 |
| 4,430,384 | 2/1984 | George | 428/343 |
| 4,992,331 | 2/1991 | DeCoste | 428/354 |
| 5,061,559 | 10/1991 | Ogusi | 428/343 |

*Primary Examiner*—Jenna L. Davis
*Attorney, Agent, or Firm*—Sughrue, Mion, Zinn, Macpeak & Seas

[57] ABSTRACT

A tracking resistant pressure-sensitive adhesive tape comprising an electrically insulating film having a comparative tracking index by an tracking resistant test of the IEC method of at least 400 V, a modulus of elasticity of from 20 to 1,200 kg/mm$^2$, and a thickness of from 5 to 150 μm, and having formed on one side thereof a pressure-sensitive adhesive layer.

3 Claims, 1 Drawing Sheet

TRACKING RESISTANT PRESSURE-SENSITIVE ADHESIVE TAPE

This is a continuation of application Ser. No. 08/027,847 filed Mar. 8, 1993 now abandoned.

FIELD OF THE INVENTION

The present invention relates to a tracking resistant pressure-sensitive adhesive tape which is used by taping as an interlayer of a coil for transformer or other coils.

BACKGROUND OF THE INVENTION

Recently, with reduction on size and weight of instruments, a creep distance acting to the surfaces of insulators of the instruments is greatly increased and it has been required for a pressure-sensitive adhesive tape used by taping as an interlayer electrical insulation of the coil for transformer, etc., to greatly increase tracking resistance properties of the tape.

Hitherto, a polyester pressure-sensitive adhesive tape and a barrier tape (epoxy-impregnated polyester/glass cloth) are used for interlayer electrical insulation of a transformer coil, etc., of home electric appliances, but the tracking resistant properties of these electrical insulating tapes are in the range of from 250 to less than 400 V by the evaluation of a comparative tracking index (hereinafter referred to as "CTI") of an IEC method. However, recently, for increasing the tracking resistant properties, it has been required to increase the CTI value above 400 V.

Now, in an electrically insulating pressure-sensitive adhesive tape which is used by interlayer taping the coil for transformer, etc., it is necessary to use a considerably self-supporting tape in order to avoid poor handling properties of the tape at taping due to flexibility of the tape (hereinafter referred to as "poor handling properties" for simplicity).

However, if the self-supporting property of a pressure-sensitive adhesive tape is increased, the bending rigidity of the tape is increased and the anti-bending force of the taped pressure-sensitive adhesive tape itself is increased, whereby the pressure-sensitive adhesive tape tends to peel off at the taped end portion.

However, since the taped end portion of a pressure-sensitive adhesive tape exists at the surface of the taped layer, which is the place having a possibility of being exposed to a tracking phenomenon, if the taped end portion peels off and lifts from the surface, cutting by a Joule's heat of an electrically conductive liquid(water containing salts, dusts, or ionically contaminated materials)-attached leaked electric current path through the taped end portion tends to occur at the taped end portion. In the instance of cutting, a discharge occurs and since the discharge causes carbonization at the beginning of tracking, peeling off of the taped end of the pressure-sensitive adhesive tape becomes a cause of causing a tracking phenomenon.

Hitherto, for restraining the occurrence of the tracking phenomenon, an electrically insulating material having excellent tracking resistant properties by itself or an electrically insulating material having mixed therewith an inorganic powder has been used.

However, in an electric instrument electrically insulated by taping of an electrically insulating pressure-sensitive adhesive tape, even when a material having excellent tracking resistant properties is used for the electrically insulating tape, if peeling off occurs at the taped end of the electrically insulating pressure-sensitive adhesive tape as described above, the improvement on the tracking resistant properties of the instrument itself cannot be attained.

SUMMARY OF THE INVENTION

An object of the present invention is to provide a tracking resistant pressure-sensitive adhesive tape capable of easily forming an electrically insulating layer having excellent tracking resistant properties without causing the "poor handling properties" at taping.

Thus, according to the present invention, there is provided a tracking resistant pressure-sensitive adhesive tape comprising an electrically insulating film having a comparative tracking index by a tracking resistance test according to an IEC method (IEC 112 Ver 3A Method) of at least 400 V, a modulus of elasticity of from 20 to 1,200 kg/mm$^2$, and a thickness of from 5 to 150 µm and having formed on one side thereof a pressure-sensitive adhesive layer.

DETAILED DESCRIPTION OF THE INVENTION

The tracking resistant test according to the IEC method described above is conducted by applying a definite voltage of a commercial frequency to a test piece, dropping an aqueous solution of 0.1% ammonium chloride to the test piece at an interval of 30 seconds, and measuring the dropped number of the solution until the test piece causes a tracking breakage, and the CTI value corresponds to the voltage when the test piece is broken with the dropped number of 50.

In the present invention, the modulus of elasticity of the insulating film is defined in the range of from 20 to 1,200 kg/mm$^2$ and the thickness thereof is defined in the range of from 5 to 150 µm. The reason for this is that if the above-described values are less than the lower limits of the ranges, the "poor handling properties" develop at taping the pressure-sensitive adhesive tape, whereby it is difficult to conduct taping of the pressure-sensitive adhesive tape smoothly, while if the above-described values are above the upper limits of the ranges, the bending rigidity of the pressure-sensitive adhesive tape is increased and the anti-bending force of the taped pressure-sensitive adhesive tape is increased, whereby the taped end of the pressure-sensitive adhesive tape tends to peel off.

Then, the examples of the present invention are explained by referring to the accompanying drawings.

Figure 1:
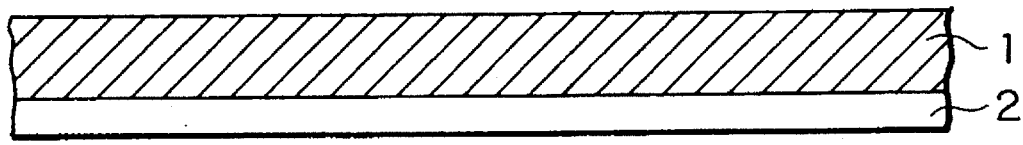
FIG. 1 is a schematic cross sectional view showing one example of the tracking resistant pressure-sensitive adhesive tape of the present invention.

FIG. 1 is a schematic cross sectional view showing one example of the present invention.

In FIG. 1, numeral 1 is a plastic film having an CTI value of at least 400 V, a modulus of elasticity of from 20 to 1,200 kg/mm$^2$, and a thickness of from 5 to 150 µm. Single layer films of polyolefin series resins such as polypropylene, polymethylpentene, etc.; fluorine series hydrocarbon resins such as vinylidene fluoride, polytetrafluoroethylene, ethylenetetrafluoroethylene, etc.; butyl rubber; polymethyl methacrylate; etc., can be used as the plastic film.

Numeral 2 is a pressure-sensitive adhesive layer, and acryl series, rubber series, and silicone series pressure-sensitive adhesives or these pressure-sensitive adhesives having added thereto a flame retardant can be used as the pressure-sensitive adhesive.

In addition, onto the surface of the plastic film 1 may be applied an adhesion treatment such as coating of a primer layer, a corona discharging treatment, etc., for the pressure-sensitive adhesive formed thereon.

Figure 2:
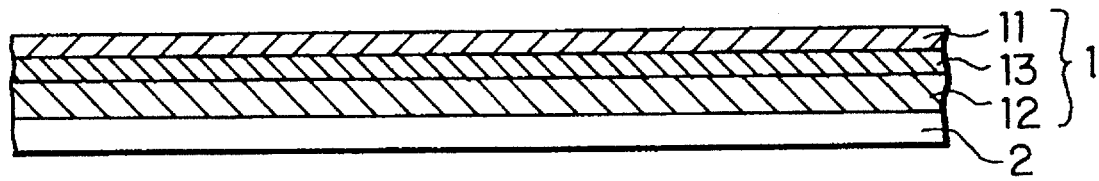
FIG. 2 is a schematic cross sectional view showing another example of the tracking resistant pressure-sensitive adhesive tape of the present invention.

FIG. 2 is a schematic cross sectional view showing another example of the present invention. In FIG. 2, numeral 1 is a composite film formed by laminating a surface layer film 11 having a CTI value of at least 400 V and a support film 12 with an adhesive 13. The modulus of elasticity of the composite film is from 20 to 1,200 kg/mm$^2$ and the thickness thereof is from 5 to 150 µm. Numeral 2 is a pressure-sensitive adhesive layer which is formed on the surface of the support film opposite the surface layer.

Films of polyolefin series resins having a heat resistance higher than that of polypropylene or fluorinated hydrocarbon series resins such as vinylidene fluoride, Polytetrafluoroethylene, ethylenetetrafluoroethylene, etc., each having a thickness of from 0.5 to 80 µm, are preferably used as the surface layer film 11.

Films of polyester, polyethylene naphthalate, polyphenylene sulfide, polyether ether ketone, and polyimide, a tissue paper, an epoxy resin-impregnated polyester nonwoven fabric, and a glass cloth, each having a thickness of from 1.5 to about 150 µm, can be used as the support film 12.

Hot melt adhesives such as polymethyl methacrylate, ethylene-ethylacrylate copolymer (EEA), ethylene-vinyl acetate copolymer (EVA), etc., can be used as the adhesive 13, and the adhesive preferably has a thickness of from 0.1 to 50 µm.

The reason that the thickness of the surface layer is from 0.5 to 80 µm is that the thickness of at least 0.5 µm is advantageous to ensure the tracking resistant properties of at least 400 V in the CTI value and the thickness of up to 80 µm is advantageous to ensure the taping workability of the pressure-sensitive adhesive tape by preventing the occurrence of curling of the composite film.

The reason that the thickness of the support tape is from 1.5 to about 150 µm is that the thickness of at least 1.5 µm is advantageous to ensure the mechanical strength required for taping the pressure-sensitive adhesive tape and also the thickness of up to about 150 µm is advantageous to prevent the occurrence of peeling off of the taped end of the pressure-sensitive adhesive tape caused by the bending rigidity of the tape.

Also, the reason that the thickness of the adhesive is from 0.1 to 50 µm is that the thickness of at least 0.1 µm is advantageous to ensure the strength of the interlayer adhesive strength and the thickness of up to 50 µm is advantageous to reduce the total thickness of the whole tape below 150 µm.

Figure 3:
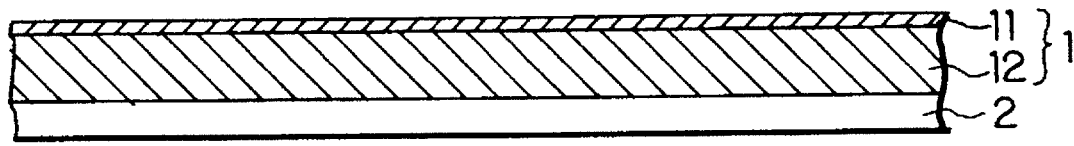
FIG. 3 is a schematic cross sectional view showing still another example of the tracking resistant pressure-sensitive adhesive tape of the present invention.

FIG. 3 is a schematic cross sectional view showing still another example of the present invention.

In FIG. 3, a composite film 1 is formed by forming an electrically insulating coating layer 11 having the CTI value of at least 400 V on one surface of a support film 12, and a pressure-sensitive adhesive layer 2 is formed on the other surface of the support film 12.

The modulus of elasticity of the composite film 1 is from 20 to 1,200 kg/mm$^2$ and the thickness thereof is from 5 to 150 µm.

The same material as in the example shown by FIG. 2 can be used as the support film in the example of FIG. 3.

Then, the tracking resistant test results of the tracking resistant pressure-sensitive adhesive tapes of the present invention are explained by the following examples.

EXAMPLE 1

A film composed of a vinylidene fluoride resin layer and a polymethyl methacrylate resin layer and having a thickness of 50 µm was obtained by a double layer melt extrusion, and an acrylic pressure-sensitive adhesive was then coated on the polymethyl methacrylate resin layer at a thickness of 25 µm to obtain a tracking resistant pressure-sensitive adhesive tape having a thickness of 75 µm.

The tape had a modulus of elasticity of 140 kg/mm$^2$, a tensile strength of 3.7 kg/10 mm width, an elongation of 180%, a dielectric strength of at least 1.875 kV/min, and a continuously usable temperature of 140° C.

EXAMPLE 2

A polypropylene and an ethylene-vinyl acetate copolymer (EVA) were simultaneously extruded at thicknesses of 10 µm and 5 µm, respectively, by extruding machines placed in parallel and were bonded to each other to form a film. A polyester film was bonded to the ethylene-vinyl acetate copolymer layer of the film to provide a composite film having a thickness of 45 µm, and an acrylic pressure-sensitive adhesive layer containing a flame retardant agent was formed on the polyester film surface of the composite film to provide a tracking resistant pressure-sensitive adhesive tape having a total thickness of 65 µm.

The tape had a modulus of elasticity of 570 kg/mm$^2$, a tensile strength of 5.6 kg/mm width, an elongation of 80%, a dielectric strength of at least 1.875 kV/min, and a continuously usable temperature of 120° C.

EXAMPLE 3

A film composed of a polymethylpentene resin layer and an ethylene-vinyl acetate copolymer resin layer was prepared by a double layer extrusion of these resins, and a polyester film having a thickness of 25 µm was then laminated on the surface of the ethylene-vinyl acetate copolymer resin layer of the film by means of a heat roll. An acrylic pressure-sensitive adhesive layer was formed on the surface of the polyester film of the thus obtained composite film having a thickness of 40 µm to obtain a tracking resistant pressure-sensitive adhesive tape having a total thickness of 50 µm.

The tape had a modulus of elasticity of 530 kg/mm$^2$, a tensile strength of 5.8 kg/10 mm width, an elongation of 100%, a dielectric strength of at least 1.875 kV/min, and a continuously usable temperature of 120° C.

COMPARATIVE EXAMPLE

An acrylic pressure-sensitive adhesive was coated on a polyester film having a thickness of 50 µm to obtain a tracking resistant pressure-sensitive adhesive tape having a thickness of 55 µm.

Each of the tapes obtained in the Examples and Comparative Example was lapped once around a columnar electrically insulating rod. When the lapped portion was disposed between electrodes and the CTI value was measured according to the tracking resistant test of the IEC method described above, the CTI value was above 600 V in each of the tapes obtained in the Examples of the present invention. On the other hand, in the tape of the Comparative Example, the lapped portion peeled off and the CTI value was 280 V only.

Since the tracking resistant pressure-sensitive adhesive tape of the present invention can be taped while preventing the occurrence of peeling off at the taped end and removing development of the "poor handling properties" by employing the tape having the modulus of elasticity and the thickness as described above, the excellent tracking resistant properties of at least 400 V in the CTI value of the tape itself can be ensured for an electric instrument by an easy taping work.

While the invention has been described in detail and with reference to specific embodiments thereof, it will be apparent to one skilled in the art that various changes and modifications can be made therein without departing from the spirit and scope thereof.

What is claimed is:

1. A tracking resistant pressure-sensitive adhesive tape comprising an electrically insulating film wherein said electrically insulating film is a composite film of a surface layer and a support film, wherein said surface layer comprises a polyolefin series resin, butyl rubber, or polymethyl methacrylate, and wherein said electrically insulating film has a comparative tracking index by an tracking resistant test of the IEC method of at least 400 V, a modulus of elasticity of from 20 to 1,200 kg/mm$^2$, and a thickness of from 5 to 150 μm, and having formed on one side thereof a pressure-sensitive adhesive layer.

2. The tracking resistant pressure-sensitive adhesive tape of claim 1, wherein the support film is a film having a thickness of about 150 μm comprising polyester, polyethylene naphthalate, polyphenylene sulfide, polyether ether ketone, polyimide, a tissue paper, an epoxy resin-impregnated polyester nonwoven cloth, or a glass cloth.

3. The tracking resistant pressure-sensitive adhesive tape of claim 1, wherein said pressure-sensitive adhesive layer contains a flame retardent agent.

\* \* \* \* \*